April 9, 1935.  Y. P. G. LE PRIEUR ET AL  1,997,303
ANTIAIRCRAFT FIRE CONTROL TABLE
Filed Oct. 18, 1933  6 Sheets-Sheet 1

Inventors:
Y. P. G. Le Prieur
A. L. Ricordel
By Williams, Bradbury, McCalib & Hinkle
Attys.

April 9, 1935.  Y. P. G. LE PRIEUR ET AL  1,997,303
ANTIAIRCRAFT FIRE CONTROL TABLE
Filed Oct. 18, 1933   6 Sheets-Sheet 2

Inventors:
Y. P. G. Le Prieur
A. L. Ricordel
By Williams, Bradbury,
McCaleb & Hinkle. Attys

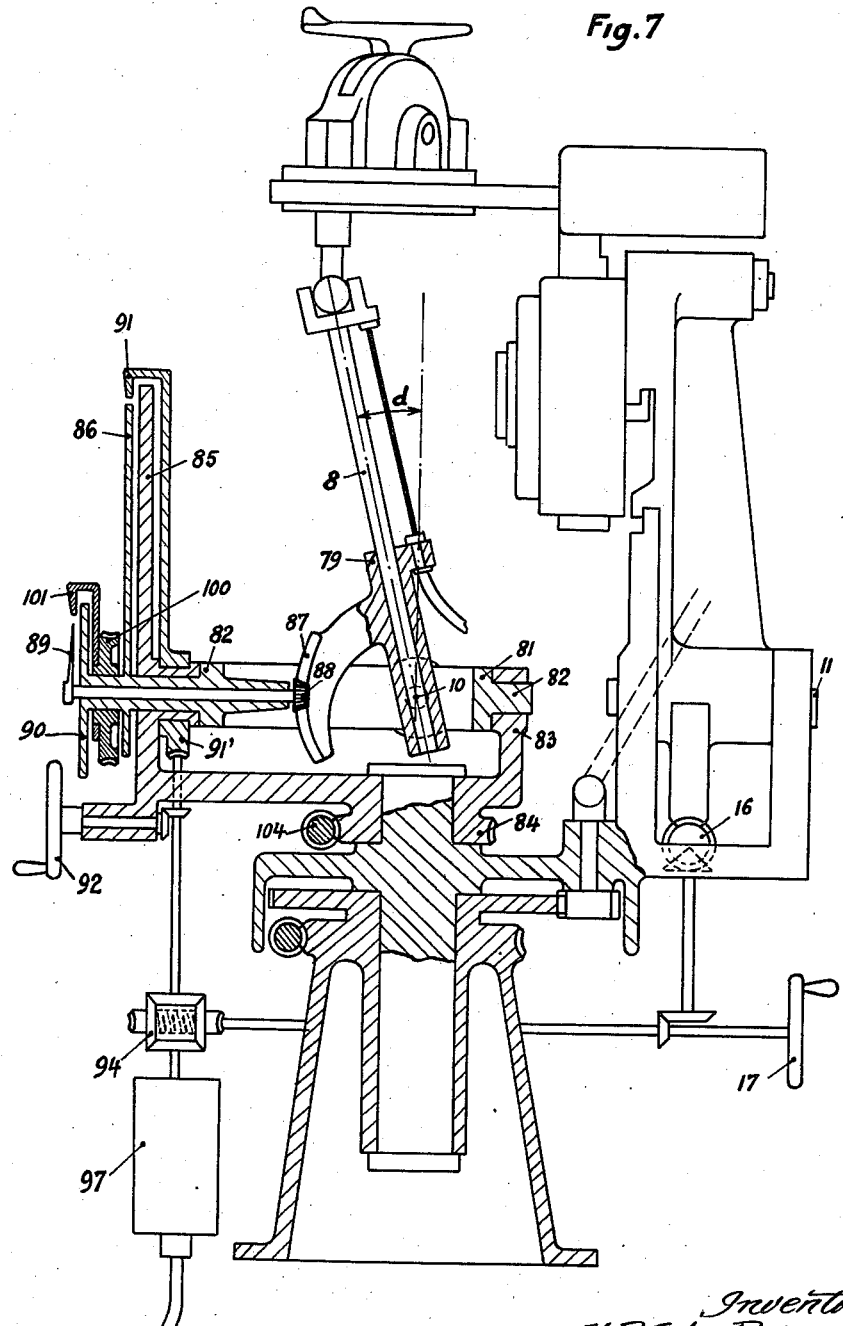

April 9, 1935. Y. P. G. LE PRIEUR ET AL 1,997,303
ANTIAIRCRAFT FIRE CONTROL TABLE
Filed Oct. 18, 1933 6 Sheets-Sheet 4

Inventors:
Y. P. G. Le Prieur
A. L. Ricordel
By Williams, Bradbury, McCaleb & Hinkle Attys.

April 9, 1935.  Y. P. G. LE PRIEUR ET AL  1,997,303
ANTIAIRCRAFT FIRE CONTROL TABLE
Filed Oct. 18, 1933   6 Sheets-Sheet 5

Inventors:
Y. P. G. Le Prieur
A. L. Ricordel
By Williams, Bradbury, McCaleb & Hinkle, Attys.

Patented Apr. 9, 1935

1,997,303

UNITED STATES PATENT OFFICE 1,997,303

ANTIAIRCRAFT FIRE CONTROL TABLE

Yves Paul Gaston Le Prieur and Auguste Louis Ricordel, Paris, France, assignors to Society la Precision Moderne, Paris, France, a corporation of France Application October 18, 1933, Serial No. 694,140
In France October 20, 1932

11 Claims. (Cl. 89—41.70)

The present invention concerns a device providing the possibility of transmitting at a distance the indications concerning the position in space of a portion of a straight line movable around a fixed point, particularly applicable for firing upon movable objectives, the portion of a straight line being in this case the gun-parallel arm of a directing device of any known type.

Let O be a point fixed in space and around which the line OA may turn (Figure 1). It is obvious that by means of the two planes V and H passing through O the one vertical and the other horizontal, any position of the segment OA may be defined by two angles, and this, in two ways by using two different systems of coordinates. The first way consists in using as coordinates:

(a) The angle I' between the intersection line $Ox$ of the two reference planes and the projection OA' of the line OA on the vertical plane V. This angle will be referred to in the following as "apparent inclination."

(b) The angle $d$ between the line OA and its projection OA' on the vertical plane V. This angle will be termed the "true angle of drift."

The second way consists in using:

(a) The angle I, "true inclination", between the line OA and its projection OA'' on the horizontal plane H.

(b) The angle $d_h$, "horizontal drift" between $Ox$ and the projection OA'' of OA on the horizontal plane H.

In the above, it has been assumed that the two reference planes V and H are fixed. In practice however, when it is desired to command the firing upon a moving objective, the vertical plane containing the sighting telescope of the corrector is taken as vertical reference plane, the line OA representing, as indicated above, the direction of the gun-parallel arm. Thus, the reference plane V becomes movable, and in the case of indirect firing corresponding to the second system of coordinates, the guns are being transmitted not only the horizontal drift $d_h$, but also the bearing $Z_0$ of the plane of sight V (i. e. the angle between $Ox$ and the north-south line), in order to obtain the angle Z which is indispensable for determining the horizontal projection of OA.

In the case where the device is designed to control the firing of the gun of a ship subject to rolling and pitching, the horizontal reference plane H also becomes movable. In fact, it is desired to transmit to the guns the angles determined with respect to the deck of the ship on which they are fixed, the position of this deck in space varying continuously owing to the rolling and pitching motion. One is thus forced to make one part of the device, for instance the sight glass, dependent on the movements of the ship, whilst the gun-parallel arm is made to depend on a plate which is constantly kept horizontal by means of a gyroscopic device for instance. It is obvious that the angles which are in this way transmitted by the device are thus precisely the angles that have to be made by the guns with respect to the deck of the ship for attaining the objective.

By way of example, a preferred embodiment of the invention will now be described with reference to the accompanying drawings, together with its application to anti-aircraft firing for land and marine guns.

Figure 7 is a vertical section through the device which is the object of the invention.

Figure 12:
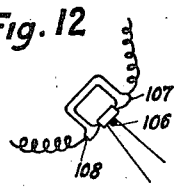

Figure 12 concerns an electric servo-device for the follow-up system.

Figure 13:
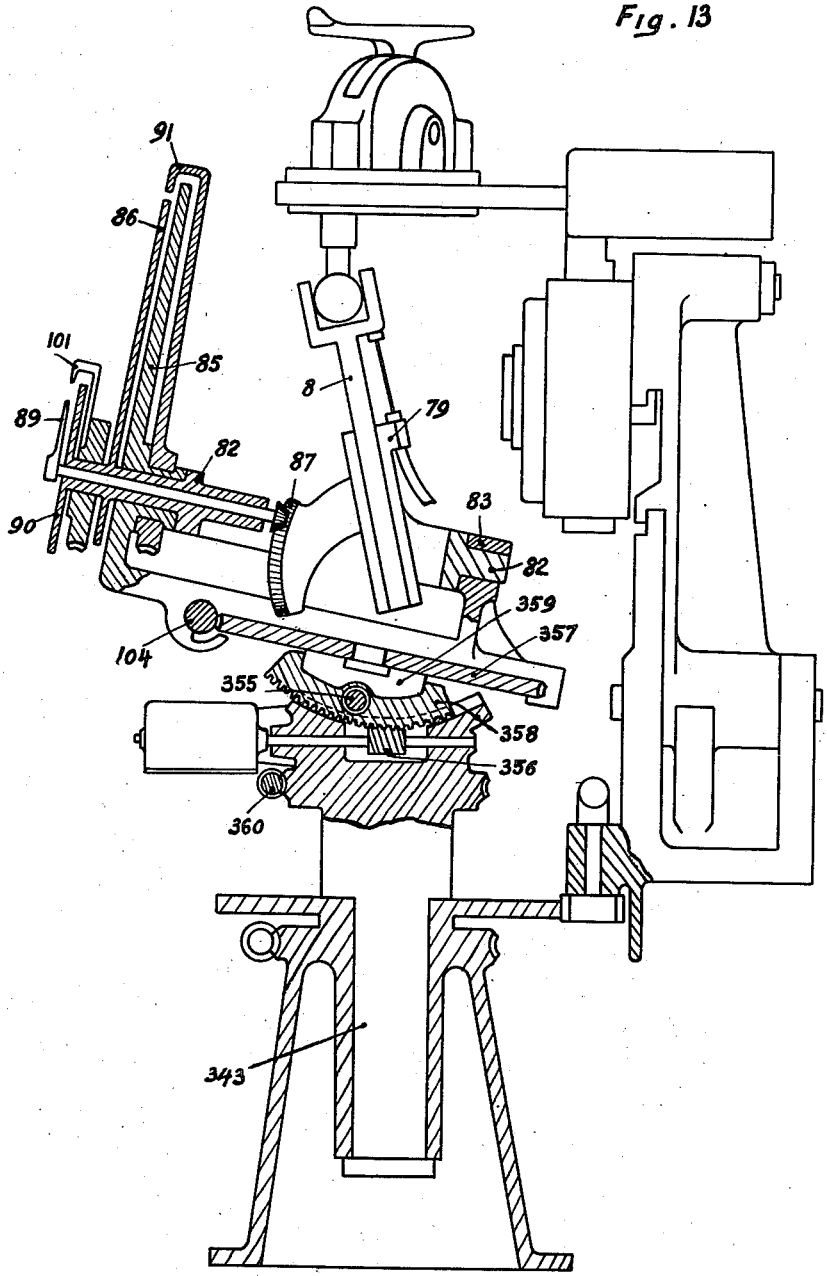

Figure 13 shows in sectional elevation the modified device for use in connection with guns on board of a ship.

In the description of the device which is the object of the present invention, the latter has been illustrated, by way of example, in connection with an anti-aircraft firing corrector of the type described in the prior U. S. Patent 1,844,429 of the inventors. The new director may of course be employed in connection with any other known firing corrector.

In order to render the present description more readily comprehensive, the principle and the operation of the corrector which has been chosen for the sake of example, will be briefly recalled.

Figure 1:
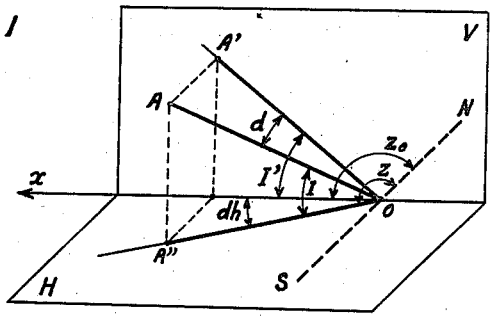
Figure 1 is a diagram serving to illustrate the principle of the device.
Figure 3:
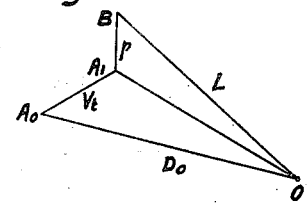
Figure 3 is a diagram concerning a corrector of the type of Figure 2.
Figure 2:
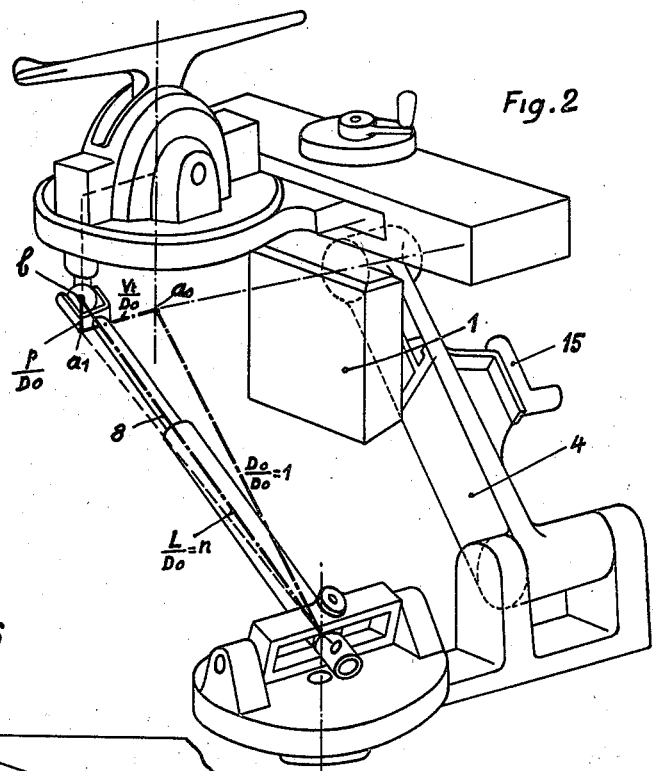
Figure 2 is a perspective view of a firing corrector of a known type.

The corrector which is represented in perspective view on Figure 2 is designed to reproduce at a reduced scale the three-dimensional polygon of Figure 3, the four sides of the said polygon representing respectively the present distance $OA_0=D_0$ of the objective, the distance $A_0A_1=Vt$ travelled through by the objective at the speed V during the time $t$ of the travel of the projectile, the drop $A_1B=p$ of the trajectory of the projectile at the point where the projectile attains the objective, and the length $OB=L$ along the tangent at the origin of the trajectory (i. e. along the produced axis of the gun) till to the vertical $A_1B=p$ of the point where the projectile attains the objective. In the patent concerning this corrector, in which the sight-glass is moved with respect to the gun, the variable scale of reduction has been chosen equal to 1/L. This choice offers the advantage of giving a constant length to the side representing the axis of the gun. Then, as in the present case, it is desired to control a director whose sight-glass is continuously directed towards the objective and in which the gun-parallel arm is displaced with respect to the sight-glass, it is preferable to choose the reduction scale also variable and equal to $1/D_0$, said choice resulting in the advantage that the side representing the line $D_0$ is thus given a constant length, and that the pointer is not displaced during adjustment of the device. The rotation of a disc connected to certain appropriate transmission parts may deform this polygon so as to give its sides OB, $A_0A_1$ and $A_1B$ of given direction (the last side $D_0$ parallel to the sight-glass being the fixed length $$\frac{D_0}{D_0}=1$$

taken as unity, according to the above) a series of successive values each of them corresponding to a determined firing at a given distance. This disc carries an abacus consisting in curves of equal distance $D_0$ traced in terms of $$\frac{L}{D_0}$$

in front of the abacus a pointer may move, the displacements of this pointer representing the variations of the length of the side $$OB=\frac{L}{D_0}$$

whereby it is possible, by operating the instrument until the pointer comes upon the curve $D_0$ corresponding to the telemetric distance of the objective, to realize with the instrument the polygon exactly corresponding to the considered case of firing.

The instrument, as it is shown by Figure 2, comprises a frame 1, which is maintained vertical by means of a parallelogram and two arms, one of which 4 is of fixed length and is kept constantly parallel to the sight-glass 15, whilst the other arm 8 is of the telescope type and thus of variable length and remains constantly parallel to the gun. This arm of variable length is called the gun-parallel arm of the corrector.

In order to simplify the description, only the correction terms $A_0A_1=Vt$ of the displacement of the objective and the drop $p$ of the trajectory have been taken into account. It is obvious that the director may just as well be combined with a corrector of a similar but more elaborate type giving, further, the correction due to the wind and that due to the movement of the gun itself, the vector $A_0A_1$ representing in this case the resultant R of the three partial correction-vectors.

Figure 6:
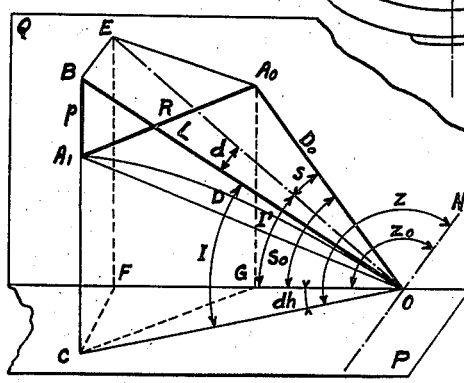
Figure 6 is a geometrical figure showing the correction angles used.

Figure 6 is a perspective diagram where the polygon $OA_0A_1B$ of Figure 3 is recognized.

The plane Q is the vertical plane containing the present line of sight $OA_0$, axis of the sight-glass.

The plane P is the horizontal plane passing through the observing station.

The point E is the projection of the point B on the plane Q, the point C, that of the point B on the plane P, and F is the projection of C on the plane Q. In the case of direct firing, the gun receives:

(a) The angle $s$ of total correction of the site, which is equal to $s_0-I'$ ($s_0$ is the present site and $I'$ the projection of the inclination I or the angle between the axis of the gun and the horizontal), (b) The leeway drift angle $d$ in the plane passing through the axis of the gun and normal to the plane Q.

In the case of indirect firing, the angles to be transmitted to the guns are:

(a) The inclination I of the gun, (b) The azimuth Z of the gun, equal to the sum of the azimuth $Z_0$ of the sight-glass and of the projection $d_h$ of the angle $d$ on the horizontal plane. The angle $d_h$ is the horizontal drift.

Figure 8:
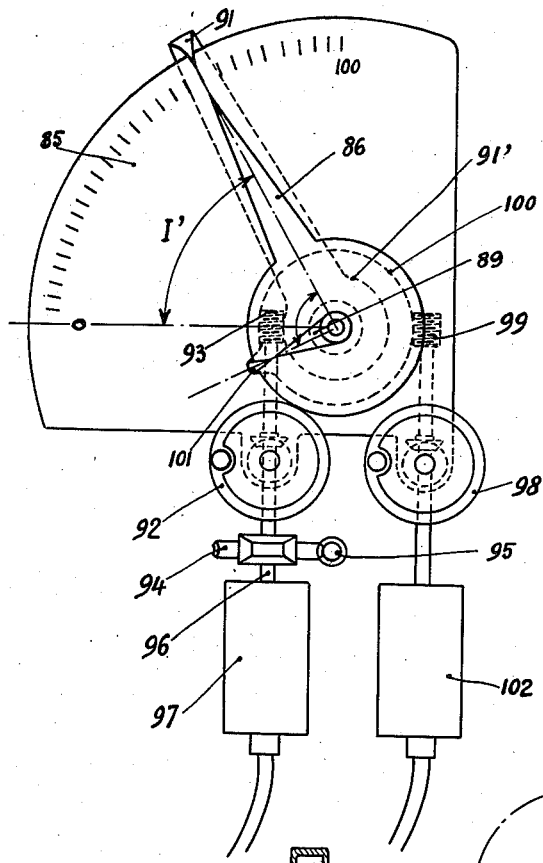
Figure 8 is an elevational view of the angle indicators.
Figure 9:
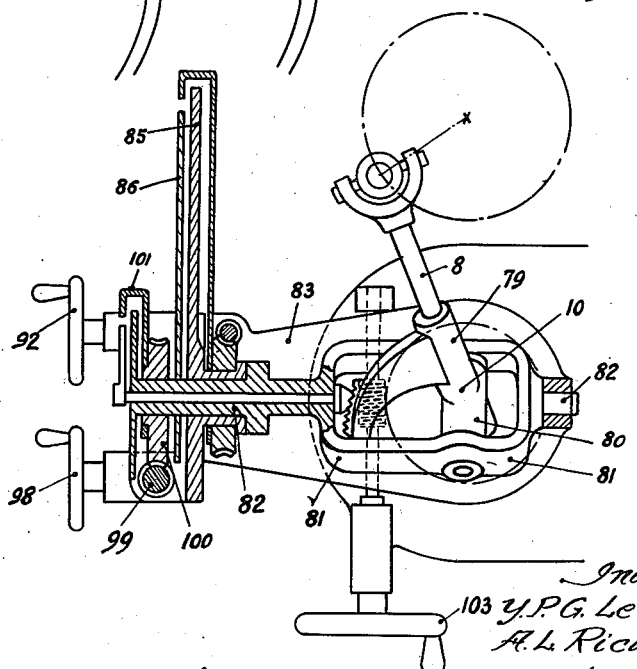
Figures 9, 10 and 11 show details of construction of the device and the manner of using the device in the case of indirect firing.
Figure 10:
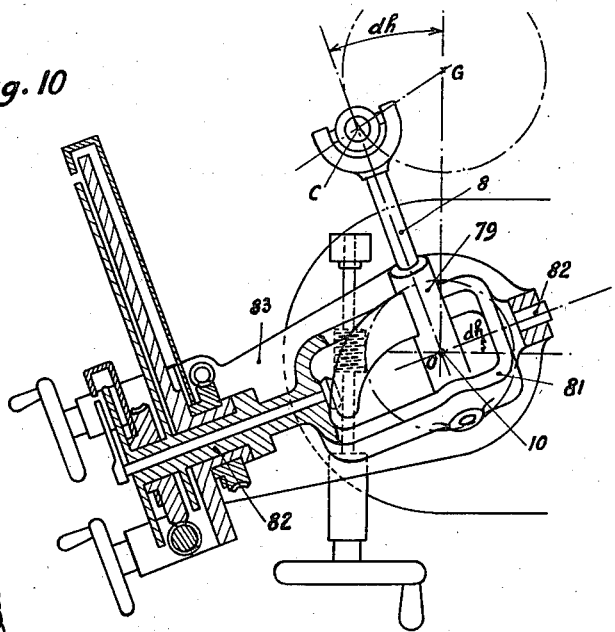
Figure 11:
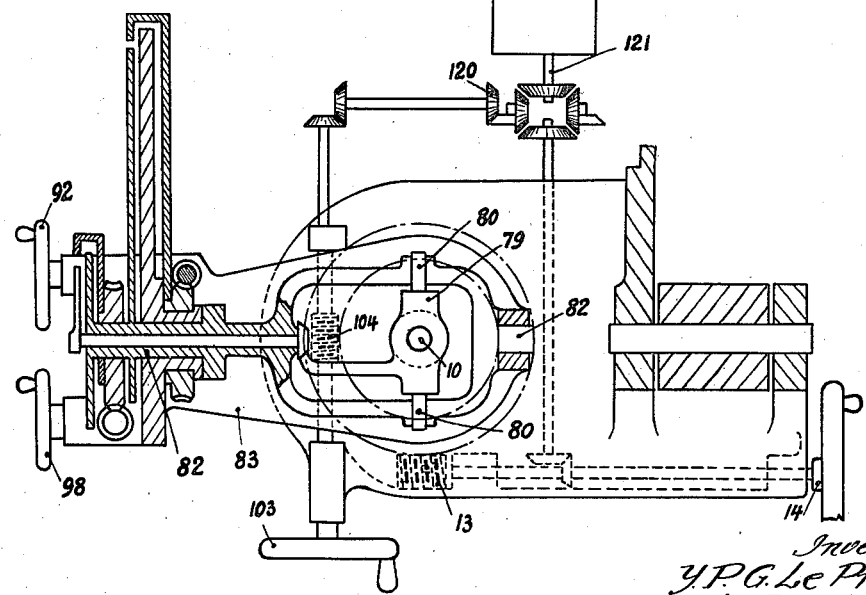

Figures 7 and 8 show the mechanism serving the purpose of measuring the angles $s$ and $d$ in the case of direct firing, and Figures 9, 10 and 11 show how the same mechanism is used for the purpose of measuring the angles I and Z in the case of indirect firing.

The main rod 8, whose direction is substantially that of the gun glides inside a sleeve 79 whose axis passes through the center 10. The sleeve 79 is pivoted on journals 80, in a frame 81 whose horizontal axis is on the same level as the center 10.

This frame is supported by journals 82 in a piece 83 formed as a fork and adapted to rotate round a vertical axis passing through the point 10 by means of a toothed wheel 84. In the case of direct firing, this wheel does not turn and the axis of the journals 82 lies along the produced axis 11.

One of the journals of the support 83 is produced by a graduated limbus 85 in form of a quarter of a circle. A pointer 86 integral with the frame 81 moves in front of the limbus 85.

The sleeve 79 is provided with a conical section 87 engaging with a pinion 88 whose axis carries a pointer 89 moving in front of a divided circular disc 90 integral with the frame 81.

By referring to Figures 2 and 6, it may be easily seen that the pointer 86 indicates the value of the angle $I'$ and the pointer 89, that of the angle $d$.

A pointer 91, integral with a toothed wheel 91' is used for following up the angle $I'$ by simply bringing it into coincidence with the pointer 86.

This following up is done by means of the wheel 92 (Figure 7) acting on one hand upon the worm drive 93 Figure 8, and on the other hand on a differential 94 which receives from the worm drive 95 a movement which is proportional to $s_0$.

The shaft 96 of the differential can transmit to the guns the angle $s_0-I'=s$ necessary for direct firing.

This transmission may be done either directly by mechanical means, or electrically by means of a transmitter 97 (Figures 7 and 8).

A crank 98 serves to record, by means of a worm drive 99, 100 (Figure 9) operating a pointer 101, the indications of the pointer 89 proportional to the drift d.

This element may also be transmitted either mechanically or electrically by means of a transmitter 102.

In the case of indirect firing, the same device serves to determine the angle of pointing and the azimuth of the gun.

The angle I is automatically indicated by the operation of the drift indicator. The latter, instead of acting on the crank 98, turns the crank 103 (Figure 9) and turns the support 83 until the pointer 89, indicating the value of the angle d, is made to read zero on the dial 90 (Figure 8).

At this moment, the horizontal axis of the frame 81 is perpendicular to the direction of the main rod 8 and the rotation of this frame round its horizontal axis, indicated by the pointer 86, indicates the angle of the main rod with the horizontal, i. e. the inclination I of the gun.

The crank 92 serves to record this angle, but the differential 94 has to be disconnected or made inoperative by means of an appropriate clutch (Figure 7).

The rotation round its vertical axis of the piece 83 is proportional to the horizontal drift $d_h$.

In fact, the wheel 84 has turned through the angle between the trace OG of the vertical plane containing the present objective and the trace OC of the vertical plane containing the gun, i. e. the angle $d_h$.

A differential 120 (Figure 11) is placed so as to totalize the rotation of the worm wheel operated by the wheel 14 of the deflection pointer, which turns proportionally to the angle $Z_0$ and the rotation of the worm wheel 104, which is proportional to the angle $d_h$.

The shaft 121 (Figure 11) driving the transmitter 105 turns proportionally to the sum of these two angles, $Z_0 + d_h = Z$.

In the case of direct as well as in the case of indirect firing, the cranks 92, 98 and 103 may be replaced by a servo-mechanism, the movement of which is controlled by a set of contacts placed on a part which is integral with the mechanical part whose position gives the element which is to be followed up (Figure 11). Thus, for the angle of firing I, the pointer 86 (Figure 8) carries a contact-spring 106 (Figure 12) movable between two studs 107 and 108, whose object is to reverse the drive of the servo-mechanism. The inventors have already imagined before a servo-device of this sort with contact amplifiers, such a device being integrally applicable in the present case.

The use of servo-devices avoids the necessity of having a follow-up servant. It ensures an instantaneous following and enables amplification of the transmitted power.

Figure 5:
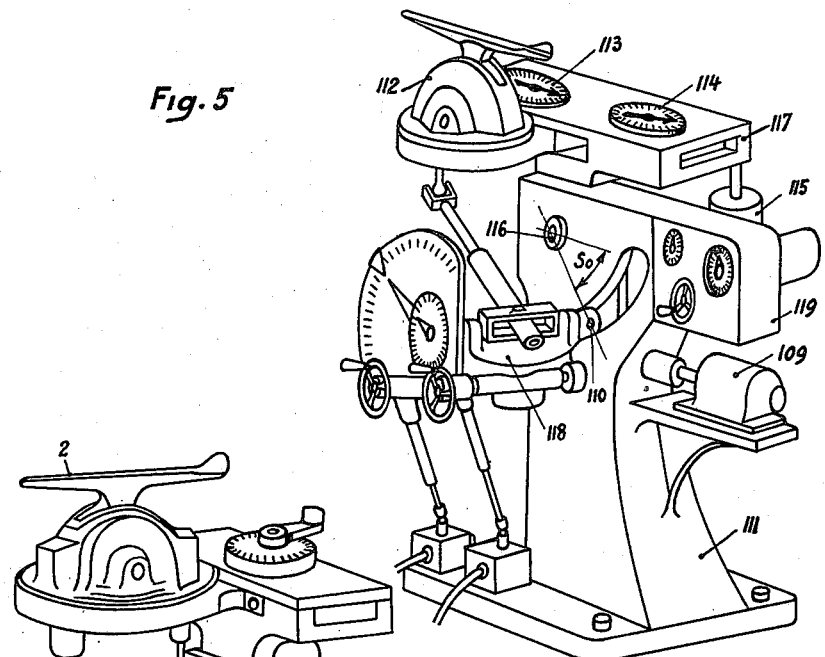
Figure 5 is a perspective view of the whole of a director for a central station, also comprising a corrector after Figure 2.
Figure 4:
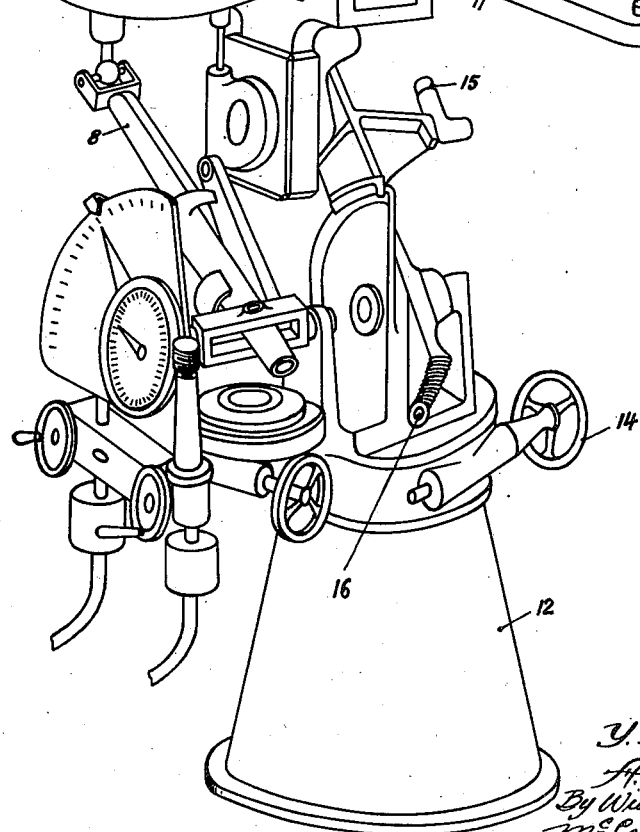
Figure 4 is a perspective view of the whole of a director with direct aiming, object of the invention, and comprising a corrector according to Figure 2.

Figure 5 is a general representation of a director at the central station.

The site $s_0$ is sent from an outer observation station to an electric receiver 109 controlling the present site arm 110 placed inside a frame 111 parallel to the vertical plane of the present site.

This vertical plane is assumed to be fixed and it is from the trace of this vertical plane, taken as origin, that all the angular azimuth and orientation indications concerning the objective, the wind and the movement of the gun itself are computed. These indications are represented by the dials 112, 113, 114 placed in convenient directions.

The initial indication is at first set by hand on these dials, and a receiver 115 for the present azimuth $s_0$ enables the indications to be constantly kept at the correct value with respect to the present site.

The axis of rotation 116 of the arm 110 is fixed to the frame 111 and it is with respect to this axis taken as origin that the dials, placed in the block 117, are lifted by an amount proportional to $$\frac{D}{D_0}.$$

A mechanical assemblage comprising the parts measuring the corrections in the case of direct firing, and measuring the inclination and the future azimuth in the case of indirect firing, is carried on the end of the arm 110.

A device, which is not shown, maintains the axis of the plate 118 vertical.

The following up operation is exactly the same as that in the director which has already been described.

The receiving and the transformation of the present distance are done in a block 119 placed on the side of the frame 111.

In the case where the device is installed on board a ship, the angles which have to be transmitted to the guns are the apparent inclination and the apparent drift, the first of these indications being measured with respect to the deck of the ship, and the second with respect to the guideline of the ship. But as the deck is not a fixed horizontal plane, owing to the rolling and pitching, it is necessary, in order that the apparent drift and the apparent inclination may correspond at any instant with the position of the objective, to introduce into the device an additional reference plane which remains horizontal notwithstanding the movements of the ship.

The fork 83 (Figure 7), in which the frame 82 may turn, is in this case no longer supported directly by the frame of the device, but by means of a pair of circular sliding parts 358 and 359 (Figure 13), placed at right angles and provided with toothed sectors driven by two worm wheels 355 and 356 so that the plane of the disc 357 on which is placed the fork 83 may perform, with respect to the plane of sight which is constantly perpendicular to the deck of the ship, movements which are exactly opposite to the movements of the deck with respect to an ideal vertical plane, fixed in space. To this effect, the sliding parts are placed in such a manner that one of them 358 is constantly parallel to the guideline of the ship. This is obtained by giving the pivot 343 an angular displacement equal in value, but of opposed direction to the drift of the objective, by means of the screw 360.

The sliding part 358 then receives on behalf of the gyroscope of the telepointer an angular displacement equal to the angle of pitch, and the sliding part 359, which is perpendicular to the first, is given an angular displacement equal to the angle of roll.

The operation with respect to the plane of the disc 357 is the same as that indicated with respect to the horizontal plane in the case of land guns. The pointer 91 indicates the angle of apparent inclination, and the rotation of the crank 103 determines the apparent drift of the gun.

What we claim is:

1. An apparatus for the transmission at a distance of the position in space of a portion of straight line movable around a fixed point, particularly designed to transmit to an anti-aircraft battery of guns or machine-guns the elements of direct and indirect firing obtained by means of an appropriate known corrector provided with a movable and telescopic gun-parallel arm, comprising a frame having an horizontal axis in which the said arm is pivoted by its lower end so as to be capable of rotating with respect to said frame only in the longitudinal plane of symmetry of said frame, a member in the shape of a fork in which said frame is horizontally and rotatably supported so as to be capable of following the gun-parallel arm in its displacements in vertical planes, said member being capable of rotating around a vertical axis passing through the rotation centre of the gun-parallel arm, a dial integral with said fork-shaped member and normally disposed with regard to the horizontal axis of said frame, a finger integral with said frame and adapted to move in front of said dial so that when the horizontal axis of said frame is perpendicular to the sight plane, the said finger indicates the projection upon the sight-plane of the gun parallel arm, i. e. the angle of site of the target, a device for indicating the actual drift angle, and means for transmitting the said corrections to the battery.

2. An apparatus for the transmission at a distance of the position in space of a portion of straight line movable around a fixed point, particularly designed to transmit to an anti-aircraft battery of guns or machine-guns the elements of direct and indirect firing obtained by means of an appropriate known corrector provided with a movable and telescopic gun-parallel arm comprising a frame having an horizontal axis in which the said arm is pivoted by its lower end so as to be capable of rotating with respect to said frame only in the longitudinal plane of symmetry of said frame, a member in the shape of a fork in which said frame is horizontally and rotatably supported so as to be capable of following the gun parallel arm in its displacements in vertical planes, said member being capable of rotating around a vertical axis passing through the rotation centre of the gun-parallel arm, a dial integral with said fork-shaped member and normally disposed with regard to the horizontal axis of said frame, a finger integral with said frame and adapted to move in front of said dial so that when the horizontal axis of said frame is perpendicular to the sight plane, the said finger indicates the projection upon the sight plane of the gun-parallel arm, i. e. the angle of site of the target, a dial integral with said frame, a finger mounted in front of said dial, a rod supported horizontally on said frame and bearing the said finger on its one end, a toothed wheel provided on the opposite end of said rod, a toothed sector integral with the gun-parallel arm and engaging the said toothed wheel, this finger being adapted to show on the dial the angle of rotation of the gun parallel arm with respect to the frame i. e.; the actual drift angle, and means for transmitting the said corrections to the battery.

3. An apparatus for the transmission at a distance of the position in space of a portion of straight line movable around a fixed point, particularly designed to transmit to an anti-aircraft battery of guns or machine-guns the elements of direct and indirect firing obtained by means of an appropriate known corrector provided with a movable and telescopic gun-parallel arm comprising a frame having a horizontal axis in which the said arm is pivoted by its lower end so as to be capable of rotating with respect to said frame only in the longitudinal plane of symmetry of said frame, a member in the shape of a fork in which said frame is horizontally and rotatably supported so as to be capable of following the gun-parallel arm in its displacements in vertical planes, said member being capable of rotating around a vertical axis passing through the rotation centre of the gun-parallel arm, a dial integral with said fork-shaped member and normally disposed with regard to the horizontal axis of said frame, a finger integral with said frame and adapted to move in front of said dial so that when the horizontal axis of said frame is perpendicular to the sight plane, the said finger indicates the projection upon the sight plane of the gun-parallel arm, i. e.; the angle of site of the target, a dial integral with said frame, a finger mounted in front of said dial, a rod supported horizontally on said frame and bearing the said finger on its one end, a toothed wheel provided on the opposite end of said rod, a toothed sector integral with the gun-parallel arm and engaging the said toothed wheel, this finger being adapted to show on the dial the angle of rotation of the gun-parallel arm with respect to the frame, i. e. the actual drift angle, and means such as a totalizing differential device for transmitting the said corrections to the battery.

4. An apparatus according to claim 3, in which the totalizing differential device for transmitting the said corrections to the battery is electrically operated.

5. An apparatus for the transmission at a distance of the position in space of a portion of straight line movable around a fixed point, particularly designed to be mounted on board of a ship and to transmit to an anti-aircraft battery of guns or machine-guns the elements of direct and indirect firing obtained by means of an appropriate known corrector provided with a movable and telescopic gun-parallel arm comprising a frame having an horizontal axis in which the said arm is pivoted by its lower end so as to be capable of rotating with respect to said frame only in the longitudinal plane of symmetry of said frame, a member in the shape of a fork in which said frame is horizontally and rotatably supported so as to be capable of following the gun-parallel arm in its displacements in vertical planes, said member being capable of rotating around a vertical axis passing through the rotation centre of the gun-parallel arm, a dial integral with said fork shaped member and normally disposed with regard to the horizontal axis of said frame, a finger integral with said frame and adapted to move in front of said dial so that when the horizontal axis of said frame is perpendicular to the sight plane, the said finger indicates the projection upon the sight plane of the gun-parallel arm, i. e. the angle of site of the target, a dial integral with said frame, a finger mounted in front of said dial, a rod supported horizontally on said frame and bearing the said finger on its one end, a toothed wheel provided on the opposite end of said rod, a toothed sector integral with the gun-parallel arm and engaging the said toothed wheel, this finger being adapted to show on the dial the angle of rotation of the gun-parallel arm with respect to the frame, i. e. the actual drift angle, a disc for supporting the fork-shaped member, a gyroscopic device for supporting said disc in a constantly horizontal position, and means for transmitting the said correction to the battery.

6. An apparatus for the transmission at a distance of the position in space of a portion of straight line movable around a fixed point, particularly designed to transmit to an anti-aircraft battery of guns or machine-guns the elements of direct and indirect firing obtained by means of an appropriate known corrector provided with a movable and telescopic gun-parallel arm, comprising a pedestal, between said pedestal and the said gun-parallel arm a universal joint constituted by two members, a vertical shaft journalled in the pedestal and carrying the lower member of the joint, a horizontal shaft journalled in said member, another shaft integral with the preceding one and disposed normally to same, the upper member of the joint being rotatably mounted on said second shaft and integral with the lower end of the gun-parallel arm, a dial integral with the lower member of the joint and disposed normally to its horizontal shaft, a finger integral with said shaft and adapted to move in front of said dial so that when the horizontal axis of said frame is perpendicular to the sight plane, the said finger indicates the projection upon the sight-plane of the gun-parallel arm, i. e. the angle of site of the target, a device for indicating the actual drift angle, and means for transmitting the said corrections to the battery.

7. An apparatus according to claim 6, wherein the movements of said gun-parallel arm control the movements of the upper member around its two axes of rotation in the case of direct firing.

8. An apparatus according to claim 6, wherein a wheel is provided for effecting the azimuthal displacement of the lower member around its vertical axis of rotation so as to indicate the drift in the case of indirect firing.

9. An apparatus according to claim 1, particularly adapted for marine guns wherein a device is interposed between said fork-shaped member and the base of the apparatus for executing movements which are exactly opposite to the movements of the deck of the ship or other platform upon which the base is mounted.

10. An apparatus according to claim 1, particularly adapted for marine guns wherein means are provided for introducing an additional reference plane which remains horizontal notwithstanding the movements of the base of the apparatus, said means comprising a pair of circular sliding parts arranged at right angles and interposed between said fork-shaped member and the base of the apparatus, and toothed sectors and cooperating worm wheels for operating said parts.

11. An apparatus according to claim 1, particularly adapted for marine guns wherein means are provided for introducing an additional reference plane which remains horizontal notwithstanding the movements of the base of the apparatus, said means comprising a pair of circular sliding parts arranged at right angles and interposed between said fork-shaped member and the base of the apparatus, and toothed sectors and cooperating worm wheels for operating said parts, and additional means for maintaining one of said sliding parts constantly parallel to the guide-line of the ship.

YVES PAUL GASTON LE PRIEUR.
AUGUSTE LOUIS RICORDEL.